United States Patent [19]
Kogure

[11] Patent Number: 5,240,054
[45] Date of Patent: Aug. 31, 1993

[54] PNEUMATIC TIRE HAVING TREAD DESIGNED FOR REDUCED NOISE

[75] Inventor: Tomohiko Kogure, Ashigara, Japan

[73] Assignee: The Yokohama Rubber Company, Ltd., Tokyo, Japan

[21] Appl. No.: 786,673

[22] Filed: Nov. 1, 1991

Related U.S. Application Data

[63] Continuation-in-part of Ser. No. 348,926, May 8, 1989, abandoned.

[30] Foreign Application Priority Data

May 11, 1988 [JP] Japan ................. 63-112546

[51] Int. Cl.$^5$ ............................................. B60C 11/04
[52] U.S. Cl. ................................................ 152/209 R
[58] Field of Search ........... 152/209 R, 209 D, 209 A

[56] References Cited
FOREIGN PATENT DOCUMENTS
3630590  3/1988  Fed. Rep. of Germany ... 152/209 R

*Primary Examiner*—Geoffrey L. Knable
*Attorney, Agent, or Firm*—Nikaido Marmelstein Murray & Oram

[57] ABSTRACT

A pneumatic tire wherein a plurality of pitches different from each other in the length constitute the whole circumference of a tread surface, the total period length of each period is divided into a former half period length and a latter half period length, and (1) in every period, the ratio of either of the two half period lengths to the total period length is 15 to 30%, or (2) in the whole circumference of the tread surface, the average value of the ratio of a smaller half period length to the total period length is 15 to 30%.

4 Claims, 1 Drawing Sheet

PNEUMATIC TIRE HAVING TREAD DESIGNED FOR REDUCED NOISE

This application is a continuation-in-part application of application Ser. No. 348,926, filed on May 8, 1989, now abandoned.

BACKGROUND OF THE INVENTION

The present invention relates to a pneumatic tire with a plurality of tread design elements different from each other in the pitch length and arranged on the tread surface which enables a reduction in the noise (pattern noise) caused by the tread design element accompanying rolling of the tire.

In order to reduce the pattern noise, a proposal has been made in the art on dispersion of the pattern noise in a wide frequency range (a frequency dependent upon the product of the number of revolutions of the tire and that of tread design elements) around the pitch frequency to make the noise inconspicuous. This method is called a variable pitch arrangement. In this method, several kinds of tread design elements (i.e., pitches) different from each other in the pitch length are properly provided in the circumferential direction of the tire so that the time intervals of a pulsatory noise or vibration caused when each tread design element is brought into contact with the ground surface is changed, thereby preventing the noise from concentrating on a particular frequency.

This method is based on frequency modulation theory employed in, for example, radio-engineering. However, in this method, no sufficient reduction in the pattern noise can be attained.

The present inventors have made studies with a view to reducing the pattern noise and, as a result, have found that the pulsation of the sound pressure level must not be overlooked as a factor which worsens the impression of the tire noise. Specifically, when the conventional sound level measuring method wherein a sound level is expressed in terms of an average value in a given period of time provides the same sound level, the auditory feeling of the human being frequently finds a difference in the sound level. The present inventors have searched for the cause of the above-described phenomenon and, as a result, have found that this phenomenon is attributable to a difference between the sound pressure level which greatly pulsates in a frequency range as low as about 10 Hz or less and the sound pressure level which does not pulsate in such a frequency range. The pulsation of the sound level, i.e., the pulsation which is one of the main causes of the noise, can be determined by outputting the change in the sound pressure level with time through reproduction at a low speed of the noise recorded at a high speed. For example, the pulsation can be determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

In the theory of the conventional tread design element arrangement with respect to the sound pressure level, it is a common practice to simulate the dispersion on a frequency axis through Fourier expansion of a sine wave train generated at the same time intervals as the order of arrangement of the tread design elements in one turn of the tire, assuming that one sine wave is generated from one tread design element. In particular, various studies and proposals have been made on a theoretical analysis in such an arrangement that the pitches are successively arranged from a short pitch to a long pitch and again to a short pitch, thereby changing the pitch length in a sine wave form (see, e.g., Jidosha Gijutsu, Vol. 28, No. 1, 1974 "Taiya Noizu ni Tsuite", and Japanese Patent Laid-Open No. 115801/1979). In these observations, no discussion is made on the pulsation of the above-described sound pressure level because the observation is made assuming that the magnitude of the vibration generated from each tread design element is constant.

The present inventors have noted that a large circumferential length of the tread design element gives rise to a large level of a vibration generated from the element and have tried a theoretical calculation under the following assumption. That is, Fourier expansion has been made assuming that the vibration generated from each tread design element is a sine wave wherein the amplitude is increased in proportion to the circumferential length of the tread design element. As a result, it has been found that, as is apparent from FIGS. 1(a) and (b) and FIGS. 2(a) and (b), when assuming that sine waves having an equal magnitude are generated from each tread design element according to the conventional calculation method, no amplitude appears in a low frequency range as shown in FIG. 1(b), while when assuming that there occurs a sine wave having an amplitude corresponding to the pitch length of the tread design element, a vibration peak appears in a low frequency range corresponding to a particular periodicity of the tread design element arrangement as shown in FIG. 2(b). In particular, when the arrangement of the tread design elements is regular, the peak in this low frequency range becomes significant, which enhances the pulsation of the sound pressure level, so that the impression of the noise is worsened.

FIGS. i(a) and 2(a) are respectively explanatory views of pitch arrangements (tread design element arrangements). Numeral 1 designates a vibration wave form. FIG. 1(b) and FIG. 2(b) are each a graph showing the relationship between the order in the Fourier analysis and the amplitude corresponding to that order. In FIG. 1(a) and FIG. 2(a), the length of pitch A is 31.7 mm, that of pitch B is 27.5 mm and that of pitch C is 24.5 mm, and pitch group $E_1$ refers to a sequence of C C C C C C, pitch group $E_2$ refers to a sequence of B B B B B B B B, pitch group $E_3$ refers to a sequence of A A A A A A A, pitch group $E_4$ refers to a sequence of B B B B, pitch group $E_5$ refers to a sequence of C C C C C C, pitch group $E_6$ refers to a sequence of B B B, pitch group $E_7$ refers to a sequence of A A A A A A, pitch group $E_8$ refers to a sequence of B B B B B B B, pitch group $E_9$ refers to a sequence of C C C C C C C C C, pitch group $E_{10}$ refers to a sequence of B B B B, pitch group $E_{11}$ refers to a sequence of A A A A A, and pitch group $E_{12}$ refers to a sequence of B B B B. The pitch arrangement shown in FIG. 1(a) is the same as that shown in FIG. 2(a). The term "pitch" used herein is intended to mean the minimum unit of a repeating pattern for constituting a tire tread design comprising a continuous repeating pattern provided in the circumferential direction of the tire. The term "pitch group" is intended to mean a portion wherein a plurality of the identical pitches among the pitches are arranged in sequence.

SUMMARY OF THE INVENTION

An object of the present invention is to provide a pneumatic tire improved in the habitability and comfort of an automobile through a reduction in the pattern noise in such a manner that in order to reduce the pulsation of a low frequency noise generated accompanying the regularity of the pitch arrangement, the pitch arrangement is improved, that is, the pitches are regularly arranged in the order of the pitch length, i.e. from a long pitch to a short pitch or vice versa and, at the same time, a period at which the long pitch is replaced by the short pitch is differentiated from a period at which the short pitch is replaced by the long pitch to reduce the pulsation of the sound pressure level.

In order to attain the above-described objects, the present invention provides a pneumatic tire wherein a plurality of pitches different from each other in the length constitute the whole circumference of a tread surface and a period of said pitches begins with the shortest pitch and contains at least one longest pitch between said shortest pitch and the shortest pitch in the next period, and when the length of each period is defined as a distance from the center of the initial group of the shortest pitches of a period to the center of the initial group of the shortest pitches of the next period, the former half period length of each period is defined as a distance from the center of the initial group of the shortest pitches of the period to the center of the initial group of the longest pitches of the period, and the latter half period length is defined as a value obtained by subtracting the former half period length from the period length, (1) in every period, the ratio of either of the two half period lengths to the total period length is 15 to 30%, or (2) in one round of the tread surface, the average value of the ratio of a smaller half period length is 15 to 30%.

DETAILED DESCRIPTION OF THE PREFERRED EMBODIMENTS

Figure 1:
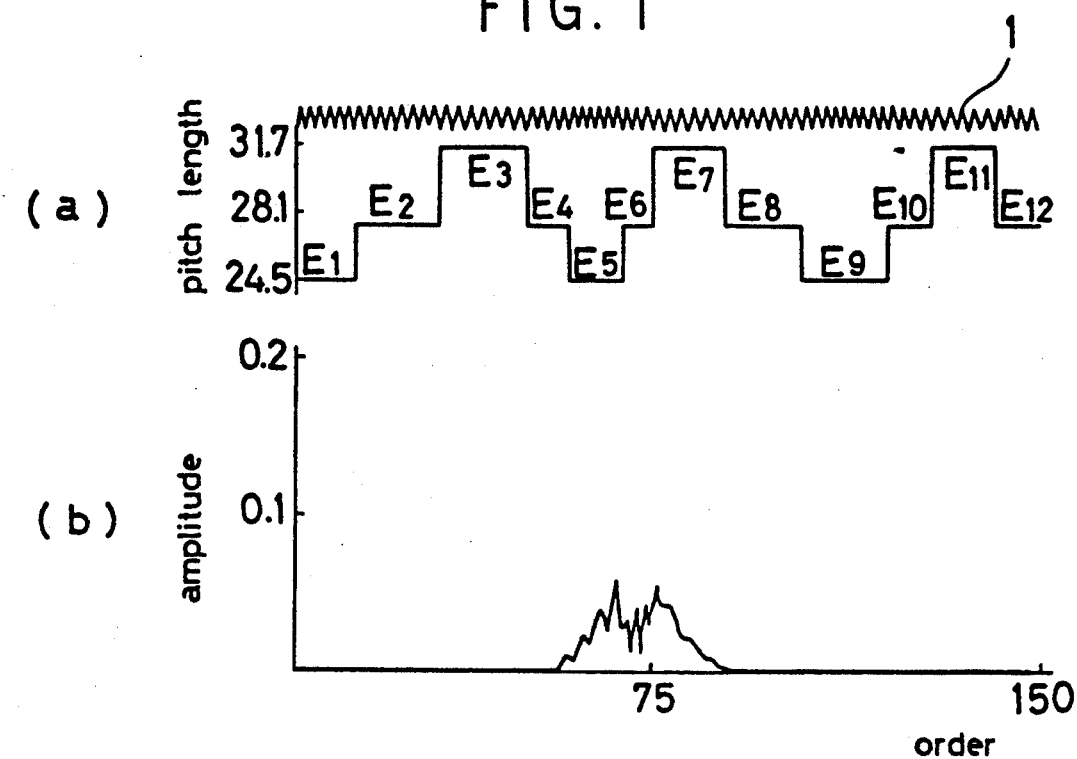
FIG. 1(a) and FIG. 2(a) are each an explanatory view of a pitch arrangement.
FIG. 1(b) and FIG. 2(b) are each a graph showing the relationship between the order in Fourier analysis and the amplitude corresponding to that order.
Figure 2:
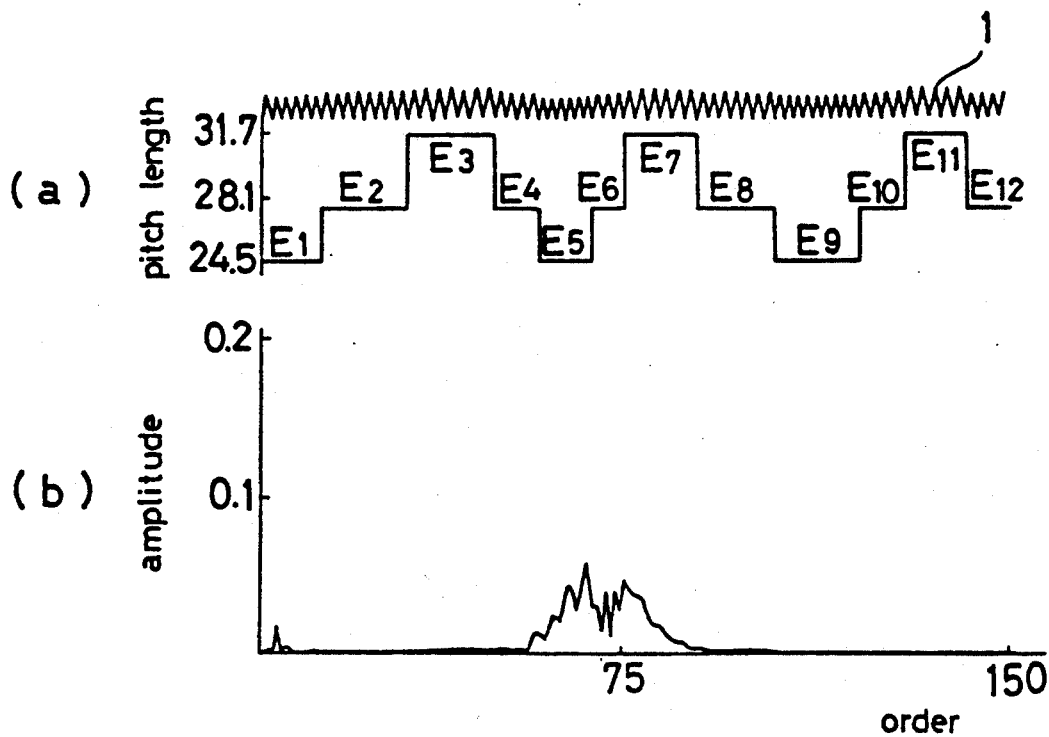

In a conventional pitch arrangement, particularly in a pitch arrangement wherein the pitches are regularly arranged beginning with a short pitch toward a long pitch and vice versa, the level of the vibration generated from one pitch depending upon the length of the pitch varies in the same way as that of a change in the arrangement, so that there occurs distinct pulsation of the noise with a low frequency corresponding to the number of the periods in which the pitches are successively arranged from a short pitch to a long pitch and again to a short pitch. In the prior art, it is known that the smaller the number of periods, the better the dispersion of the pitch noise. However, the pulsation occurred regardless of the number of periods, so that it was impossible to adopt a pitch arrangement wherein the number of periods is small. On the other hand, in order to prevent the occurrence of the pulsation phenomenon, a proposal has been made on a low-order dispersion of the pitch noise through a change in the length of the period. However, this method has exhibited no sufficient effect.

The present inventors have made studies with a view to solving the above-described problem through an improvement in the arrangement within one period. Specifically, when the length of the part where the long pitch is arranged next to the short pitch within one period is defined as CA and the length of the part where the short pitch is arranged next to the long pitch is defined as CB, the CA value is remarkably differentiated from the CB value so that a shorter one of CA and CB bears a component having a substantially shorter period length and a longer one of CA and CB bears a component having a substantially longer period length, thereby bringing about a low-order dispersion effect. Further, since a longer one of CA and CB has the effect attained by reducing the number of periods, the pitch noise is dispersed.

Based on these results of studies, in the present invention, the following requirements (1) and (2) were specified with respect to a pneumatic tire wherein a plurality of pitches different from each other in the length constitute the whole circumference of a tread surface, a period of said pitches begins with the shortest pitch and contains at least one longest pitch between said shortest pitch and the shortest pitch in the next period, the length of each period is defined as a distance from the center of the initial group of the shortest pitches of a period to the center of the initial group of the shortest pitches of the next period, the former half period length of each period is defined as a distance from the center of the initial group of the shortest pitches of the period to the center of the initial group of the longest pitches of the period, and the latter half period length is defined as a value obtained by subtracting the former half period length from the period length. The term "one period" used herein is intended to mean, when the pitch length of the shortest pitch and that of the longest pitch are assumed to be $P_{min}$ and $P_{max}$, respectively, a distance from a pitch of $P_{min}$ to a pitch located immediately before the initial pitch of $P_{min}$ in the next period, provided that the period should contain at least one pitch of $P_{max}$. When the period is free from the pitch of $P_{max}$ and the next pitch of $P_{min}$ comes, this period is extended to the next period. The term "pitch length" used herein is intended to mean the length of the pitch in the circumferential direction of the tire.

(1) In every period, the ratio of either of the two half period lengths to the total period length (length of each period) is 15 to 30%, preferably 25 to 30%.

When the ratio is less than 15%, the half period length is so small that the low-order dispersion effect is unsatisfactory, or the half period length is so small that the difference in the length between different pitches adjacent to each other in the arrangement within the half period is excessively large, which brings about occurrence of irregular abrasion. On the other hand, when the ratio exceeds 30%, both the low-order dispersion effect and the pitch noise dispersion effect are unsatisfactory.

(2) In the whole circumference of the tread surface, the average value of the ratio of a smaller half period length to the total period length (length of each period) is 15 to 30%. As in the above case (1), when the average value is less than 15%, there occurs irregular abrasion, while when it exceeds 30%, the pitch noise dispersion effect is unsatisfactory.

Preferably the present invention has the following features (a) to (c).

(a) The number of kinds of pitch is 3 to 8, preferably 4 to 6.

When the number is 2 or less, no useful low-order dispersion effect can be attained, while when it is 9 or more, the manufacturing cost of a tire mold is too high.

(b) The number of pitch periods is 2 to 6, preferably 3 to 4.

When the number of periods is 1, the pitch noise dispersion effect is very excellent, but the low-order dispersion effect derived from the former half period length and the latter half period length are unsatisfactory. On the other hand, when the number of periods is 7 or more, the length of one period is so small that no sufficient dispersion effect derived from the former half period length and the latter half period length can be attained.

(c) A more useful effect can be attained when the former half period length and the latter half period length are different in each period. It is preferred that the number of kinds of at least the former half period length and the latter half period length be larger than the number of the periods. When the manufacturing cost of a tire mold is taken into consideration, the sharing of part of the former half period length and the latter half period length in each period enables the tire to be produced at a lower cost than that of the conventional tire and, at the same time, to have a superior reduction in the noise to the conventional tire although the effect of reducing the noise is lower than that in the case of non-sharing.

The present invention will now be described in more detail with reference to the following Example.

EXAMPLE

Steel radial tires having an outer diameter of 633 mm and a tire size of 195/70 R15 (tire of the present invention, conventional tire, and comparative tire) were subjected to evaluation of noise pulsation width (dB) and impression of the noise. The results are shown in Tables 1 and 2. In Tables 1 and 2, the length of pitch A is 33 mm, that of pitch B is 30 mm, that of pitch C is 28 mm, that of pitch D is 25 mm, and that of pitch E is 22 mm. CA represents the former half period length of each period, and CB the latter half period length.

Evaluation method of noise pulsation

The noise pulsation was determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

TABLE 1

| | First period pitch: | | | | | | | | Second period pitch: | | | | | | | | Third period pitch: | | | | | | | | noise pulsation width (dB) | Remarks on impression of noise |
|---|---|---|---|---|---|---|---|---|---|---|---|---|---|---|---|---|---|---|---|---|---|---|---|---|---|---|
| | E | D | C | B | A | B | C | D | E | D | C | B | A | B | C | D | E | D | C | B | A | B | C | D | | |
| Conventional Tire 1 | 4 | 4 | 4 | 4 | 4 | 4 | 4 | 4 | 3 | 3 | 3 | 3 | 3 | 3 | 3 | 3 | 2 | 2 | 2 | 2 | 2 | 2 | 2 | 2 | 7.1 | impracticable due to large pulsation and pitch noise |
| | | | CA: 50.6% CB: 49.4% | | | | | | | | CA: 50.8% CB: 49.2% | | | | | | | | CA: 47.6% CB: 52.4% | | | | | | | |
| Comparative Tire 1 | 4 | 3 | 3 | 3 | 4 | 5 | 5 | 5 | 3 | 2 | 2 | 2 | 3 | 4 | 4 | 4 | 2 | 1 | 1 | 1 | 2 | 3 | 3 | 3 | 6.5 | slight improvement in the pulsation and noise, but insufficient to put to practical use |
| | | | CA: 41.1% CB: 58.9% | | | | | | | | CA: 45.1% CB: 54.9% | | | | | | | | CA: 29.7% CB: 70.3% | | | | | | | |
| Comparative Tire 2 | 4 | 2 | 2 | 2 | 4 | 6 | 6 | 6 | 3 | 1 | 1 | 1 | 3 | 5 | 5 | 5 | 2 | 1 | 1 | 1 | 2 | 3 | 3 | 3 | 5.0 | remarkable reductions in the pulsation and the pitch noise |
| | | | CA: 31.6% CB: 68.4% | | | | | | | | CA: 25.4% CB: 74.6% | | | | | | | | CA: 29.7% CB: 70.3% | | | | | | | |
| Tire 1 of the present invention | 4 | | 1 | | 4 | 8 | 7 | 8 | 3 | | 1 | | 3 | 6 | 5 | 6 | 2 | | 1 | | 2 | 4 | 3 | 4 | 4.1 | further reduction in the pulsation level |
| | | | CA: 15.8% CB: 84.2% | | | | | | | | CA: 16.9% CB: 83.1% | | | | | | | | CA: 17.9% CB: 82.1% | | | | | | | |
| Tire 2 of the present invention | 5 | 1 | 1 | | 5 | 8 | 7 | 8 | 2 | | 1 | | 2 | 5 | 5 | 5 | 2 | | 1 | | 2 | 4 | 3 | 4 | 4.3 | practicable although the effect of reducing pulsation is not so good as that of tire 1 of the present invention |
| | | | CA: 22.9% CB: 77.1% | | | | | | | | CA: 15.0% CB: 85.0% | | | | | | | | CA: 17.5% CB: 82.5% | | | | | | | |

As is apparent from FIG. 1, with respect to the conventional tire 1, the former half period length (CA) and the latter half period length (CB) are about half the period length in all of the first to third periods, so that the change in the size of the pitch is very regular and in the form of a sine wave. Therefore, the pulsation of the noise is significant, which renders this tire unsuitable for practical use. In comparative tire 1, the former half period length (CA) is reduced in each period but exceeds 40% in both the first and second periods. Although in the third period length, the CA value is less than 40%, the average value exceeds 35%. Therefore, the effect is observed only unsatisfactorily. In comparative tire 2, the shorter half period length is 40% or less of the total period length in every period, and remarkable reductions in the pitch noise and the pulsation can be attained over conventional tire 1. In tire 1 of the present invention, the difference in the length between the former half period and the latter half period is further increased. In this case, a further improved effect is attained. In tire 2 of the present invention, the former half period length (CA) of the second period is in the same arrangement as that of the former half period length (CA) of the third period. In this case, since part of the periphery of the mold is shared, this embodiment has an advantage with respect to the manufacturing of a mold.

be further promoted. Accordingly, the CA should necessarily be 15.0% or above.

In the tire 3 of the present invention, the CA is smaller than 30% in each of the first, the second and the third periods, and in this case, an improvement is clearly attained with respect to each of the pulsation and the pitch. Also, the mean value of CA's in all the periods is 27.8% and is smaller than 30%.

As described above, according to the present invention, a periodic arrangement constituting the whole circumference of a tire is provided on the tread surface so that the perimeter is different in every half period, thereby dispersing a low-degree peak produced in one period in the peaks around that peak to reduce the peak and, at the same time, to add a lower-degree component to the period. Therefore, the pitch noise dispersion

TABLE 2

| | First period | | | | | | | Second period | | | | | | | Third period | | | | | | | noise pulsation width (dB) | Remarks on impression of noise |
|---|---|---|---|---|---|---|---|---|---|---|---|---|---|---|---|---|---|---|---|---|---|---|---|
| | E | D | C | B | A | B | C | D | E | D | C | B | A | B | C | D | E | D | C | B | A | B | C | D | | |
| Comparative Tire 3 | 4 | 2 | 3 | 2 | 4 | 6 | 5 | 6 | 3 | 1 | 2 | 1 | 3 | 5 | 4 | 5 | 2 | 1 | 1 | 1 | 2 | 3 | 3 | 3 | 5.4 | slight improvement in the pulsation and pitch noise, but insufficient to put to practical use |
| | | | CA: 34.8% | | | | | | | | CA: 29.7% | | | | | | | | CA: 29.7% | | | | | | | |
| | | | CB: 65.2% | | | | | | | | CB: 70.3% | | | | | | | | CB: 70.3% | | | | | | | |
| Comparative Tire 4 | 5 | 0 | 1 | 0 | 5 | 9 | 7 | 9 | 2 | 0 | 0 | 0 | 2 | 5 | 6 | 5 | 2 | 0 | 0 | 0 | 2 | 4 | 4 | 4 | 4.6 | certain improvement in the pulsation, but no reduction in the pitch noise; insufficient to put to practical use |
| | | | CA: 17.2% | | | | | | | | CA: 9.9% | | | | | | | | CA: 11.6% | | | | | | | |
| | | | CB: 82.8% | | | | | | | | CB: 90.1% | | | | | | | | CB: 88.4% | | | | | | | |
| Tire 3 of the present invention | 4 | 2 | 1 | 2 | 4 | 6 | 7 | 6 | 3 | 1 | 1 | 1 | 3 | 5 | 5 | 5 | 2 | 1 | 1 | 1 | 2 | 3 | 3 | 3 | 4.8 | practicable by virtue of remarkable reductions in the pulsation and the pitch noise |
| | | | CA: 28.4% | | | | | | | | CA: 25.4% | | | | | | | | CA: 29.7% | | | | | | | |
| | | | CB: 71.6% | | | | | | | | CB: 74.6% | | | | | | | | CB: 70.3% | | | | | | | |

In the comparative tire 3, the CA in the first period is greater than 30%, so that although a slight improvement is attained in the pulsation and the pitch noise, this tire cannot stand a practical use. Also, the mean value of CA's in the first, the second and the third periods is 31.4% and exceeds 30%.

In comparative tire 4, then, the CA in each of the second and the third period is smaller than 15% and, in addition, the mean value of CA's in the first, the second and the third periods is 12.9% and is smaller than 15%. Therefore, although this comparative tire is more or less improved in or relating to the pulsation, no reduction is made in the pitch noise of this tire, and the tire again cannot stand a practical use. It is to be particularly noted that in the case of the comparative tire 4, the CA in each of the second and the third periods is so much suppressed that in a first half portion of each of such periods a maximum pitch A appears immediately after a minimum pitch E. Then, now that a tire portion of the pitch A and a tire portion of the pitch E undergo mutually differing degrees of abrasion, in the tire portion at which the pitches A and E are present directly adjacent to each other, there tends to be an abnormal deformation produced after the tire has undergone a certain extent of abrasion, so that the noise generation tends to effect can be exhibited, and it becomes possible to reduce the pitch noise. The present invention is suitable particularly as a pneumatic tire for a passenger car.

What is claimed is:

1. A pneumatic tire wherein a plurality of pitches different from each other in the length constitute the whole circumference of a tread surface and a period of said pitches begins with the shortest pitch and contains at least one longest pitch between said shortest pitch and the shortest pitch in the next period, and when the length of each period is defined as a distance from the center of the initial group of the shortest pitches of a period to the center of the initial group of the shortest pitches of the next period, the former half period length of each period is defined as a distance from the center of the initial group of the shortest pitches of the period to the center of the initial group of the longest pitches of the period, and the latter half period length is defined as a value obtained by subtracting the former half period length from the period length, in every period, the ratio of either of the two half period lengths to the total period length is 15 to 30%.

2. A pneumatic tire according to claim 1, wherein the number of kinds of pitch is 3 to 8.

3. A pneumatic tire according to claim 1, wherein the number of periods of pitch is 2 to 6.

4. A pneumatic tire for a passenger car wherein a plurality of pitches different from each other in the length constitute the whole circumference of a tread surface and a period of said pitches begins with the shortest pitch and contains at least one longest pitch between said shortest pitch and the shortest pitch in the next period, and when the length of each period is defined as a distance form the center of the initial group of the shortest pitches of a period to the center of the initial group of the shortest pitches of the next period, the former half period length of each period is defined as a distance from the center of the initial group of the shortest pitches of the period to the center of the initial group of the shortest pitches of the period to the center of the initial group of the longest pitches to the period, and the latter half period length is defined as a value obtained by subtracting the former half period length from the period length, in every period, the ratio of either of the two half period lengths to the total period length is 15 to 30%.

* * * * *